(12) United States Patent
Tsigiroglou

(10) Patent No.: US 10,692,315 B2
(45) Date of Patent: Jun. 23, 2020

(54) LOW POWER MODEM AND CONTROLLER

(71) Applicant: TBSP ENGINEERING TECHNICAL COMPANY SOCIETE ANONYME FOR TRADING, CONSTRUCTION, SUPPORT OF SYSTEMS AND PROJECTS OF HIGH TECHNOLOGY AND SAFETY AND SERVICES PROVIDER, Koropi Attikis (GR)

(72) Inventor: Kiriakos Tsigiroglou, Voula Attikis (GR)

(73) Assignee: TBSP ENGINEERING TECHNICAL COMPANY SOCIETE ANONYME FOR TRADING, CONSTRUCTION, SUPPORT OF SYSTEMS AND PROJECTS OF HIGH TECHNOLOGY AND SAFETY AND SERVICES PROVIDER, Koropi Attikis (GR)

(*) Notice: Subject to any disclaimer, the term of this patent is extended or adjusted under 35 U.S.C. 154(b) by 0 days.

(21) Appl. No.: 15/759,697

(22) PCT Filed: Sep. 14, 2016

(86) PCT No.: PCT/GR2016/000045
§ 371 (c)(1),
(2) Date: Mar. 13, 2018

(87) PCT Pub. No.: WO2017/046619
PCT Pub. Date: Mar. 23, 2017

(65) Prior Publication Data
US 2019/0051070 A1    Feb. 14, 2019

(30) Foreign Application Priority Data
Sep. 15, 2015  (GR) .............................. 20150100401

(51) Int. Cl.
*H04M 3/58*   (2006.01)
*G07C 9/00*   (2020.01)
(Continued)

(52) U.S. Cl.
CPC ....... *G07C 9/00182* (2013.01); *G06F 1/3209* (2013.01); *G06F 21/34* (2013.01);
(Continued)

(58) Field of Classification Search
CPC ...... G07C 9/00182; G07C 2009/00214; G06F 1/3209; G06F 21/34; H04L 67/125;
(Continued)

(56) References Cited

U.S. PATENT DOCUMENTS 5,784,441 A * 7/1998 Davis ................... H04M 11/04
                                                 379/106.01
6,208,727 B1 * 3/2001 Ganpaul .............. H04M 11/025
                                                 379/102.06
(Continued)

*Primary Examiner* — Munear T Akki
(74) *Attorney, Agent, or Firm* — Browdy and Neimark, P.L.L.C.

(57) ABSTRACT

The present invention is related with a modem device in conjunction with a Low Power Controller, which provides the capability of local control and remote management of electromechanical appliances in cases, where the locally available electric power is very low, and it is specially designed to be electrically powered and to communicate via a single PSTN telephone line The device has a wide application range to institutions, which own and use areas containing both passive and active equipment, and provides the capability of a single uniform solution for all such cases. It provides the ability to connect various digital and analog
(Continued)

sensors, the transmission of various commands, the process automation, the data and information collection and the remote control (management).

9 Claims, 5 Drawing Sheets

(51) Int. Cl.
   *H04M 19/00* (2006.01)
   *H04M 11/00* (2006.01)
   *G06F 1/3209* (2019.01)
   *G06F 21/34* (2013.01)
   *H04L 29/08* (2006.01)

(52) U.S. Cl.
   CPC ......... *H04L 67/125* (2013.01); *H04M 11/002* (2013.01); *H04M 11/007* (2013.01); *H04M 19/001* (2013.01); *G07C 2009/00214* (2013.01); *Y02D 70/00* (2018.01); *Y02D 70/1222* (2018.01); *Y02D 70/1224* (2018.01)

(58) Field of Classification Search
   CPC ............. H04M 11/002; H04M 11/007; H04M 19/001; Y02D 70/1222; Y02D 70/1224; Y02D 70/00
   See application file for complete search history.

(56) References Cited

U.S. PATENT DOCUMENTS

| | | | | |
|---|---|---|---|---|
| 9,009,805 | B1* | 4/2015 | Kirkby | G06K 9/00711 726/7 |
| 2004/0130437 | A1* | 7/2004 | Stevens | G06Q 20/341 340/5.72 |
| 2004/0165708 | A1* | 8/2004 | White | H04L 12/66 379/102.06 |
| 2008/0256998 | A1* | 10/2008 | Mallian | G07C 9/00182 70/275 |
| 2010/0014207 | A1* | 1/2010 | Finkenzeller | G07C 9/00182 361/143 |
| 2011/0025846 | A1* | 2/2011 | Garrett | H04N 7/18 348/143 |
| 2012/0223808 | A1* | 9/2012 | Friedli | G07C 9/00904 340/5.6 |
| 2014/0270097 | A1* | 9/2014 | Ashizuka | H04M 1/0202 379/44 |
| 2015/0179006 | A1* | 6/2015 | Von Zurmuehlen | G07F 17/12 340/5.54 |
| 2017/0372555 | A1* | 12/2017 | Clark | G07F 7/0609 |
| 2019/0057566 | A1* | 2/2019 | Mlynarczyk | G07C 9/00912 |

* cited by examiner

LOW POWER MODEM AND CONTROLLER

The present invention is related with a modem device in conjunction with a Low Power Controller, which provides the capability of local control of electromechanical appliances and the remote management of such electromechanical appliances, in cases, where the locally available electric power is very low, and it is specially designed to be electrically powered and to communicate via a single PSTN telephone line The device provides the following functions:

It has the ability (a) to be used as a small general-purpose controller, (b) to monitor remote equipment cabinets for authorized or unauthorized access to them, (c) to provide comprehensive access control functionality, using an I-Button key identification and (d) to communicate via an integrated modem with remote devices via serial communications protocols.

All modems and controllers, which have been designed and produced until now, have power requirements that exceed by far the available power which can be transferred through a single simple copper pair PSTN telephone communications line. Thus the modem and controller had to rely on outside power sources, and when those were not readily available they should depend on dry cell batteries, which have the disadvantage that they require frequent replacement, or to be relied upon electric batteries, which are charged by the PSTN line power and have the drawback of requiring periodic maintenance and replacement.

The present device has a wide application range. Mainly it can be used in any unmanned area, where there are installed electromechanical or electronic systems, referring indicatively but not limited to: telecommunications companies, natural gas and/or liquid fuels pipelines, wind generators, train stations, military radar installations, water supply networks, electricity distribution systems, photovoltaic parks, mobile telephony base stations, telecommunications networks termination cabins (KV), underground networks and access cofferdams.

In the above cases the device provides a unique solution, of low cost, with small equipment requirements, reliability and great energy savings. The device minimizes maintenance requirements and therefore the energy transfer costs in networks, typically span countrywide and in places hard to reach.

The design of the device has been made aiming at industrial scale production (mass production), while the materials selected for the production provide high reliability, so that the device can be used in unmanned locations/rural areas with difficult access, without the need of staff visits for preventive or corrective maintenance.

The device consists of:
- A power unit, which utilizes the present low power, available by the PSTN telephone line, in such a way so that it can be used to operate the device.
- A modem for communication, utilizing the PSTN line for telephone communications/calls (dial-up) or through a connection via a leased telephone line to a telephone center (PBX).
- Sufficient number of sensors for digital and analog inputs, in order to be able to be connected with other surrounding devices.
- An i-Button reader for identification of the local user.
- A buzzer to alert the local user.
- A button to send the local user signals to the unit.
- A programmable controller for managing all of the modules.

The advantages of the device are:
- Low energy consumption, so that it can operate exclusively with the power available from a PSTN telephone line
- Low-power state/'sleep mode', in which the device falls when not in use, so that it consumes even less energy
- Connection with local digital and analog peripherals for environmental monitoring
- Interaction with the local user, via an i-Button identification, activation through a press button and sound alarming via the buzzer
- Telephone dial up call through PSTN or leased line connecting the modem to a central station
- Remote controller software upgrading.

Figure 1:
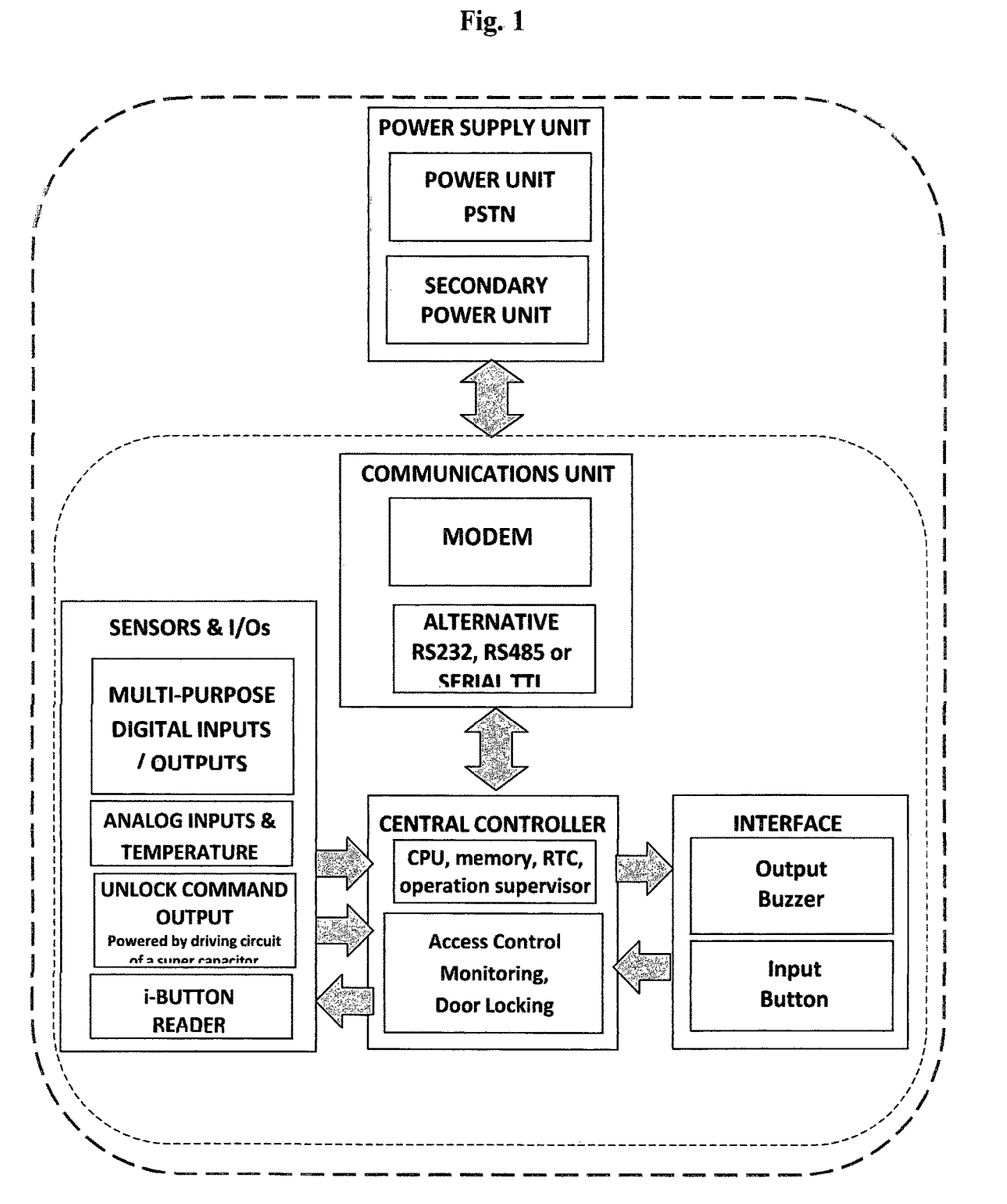
Figure 2:
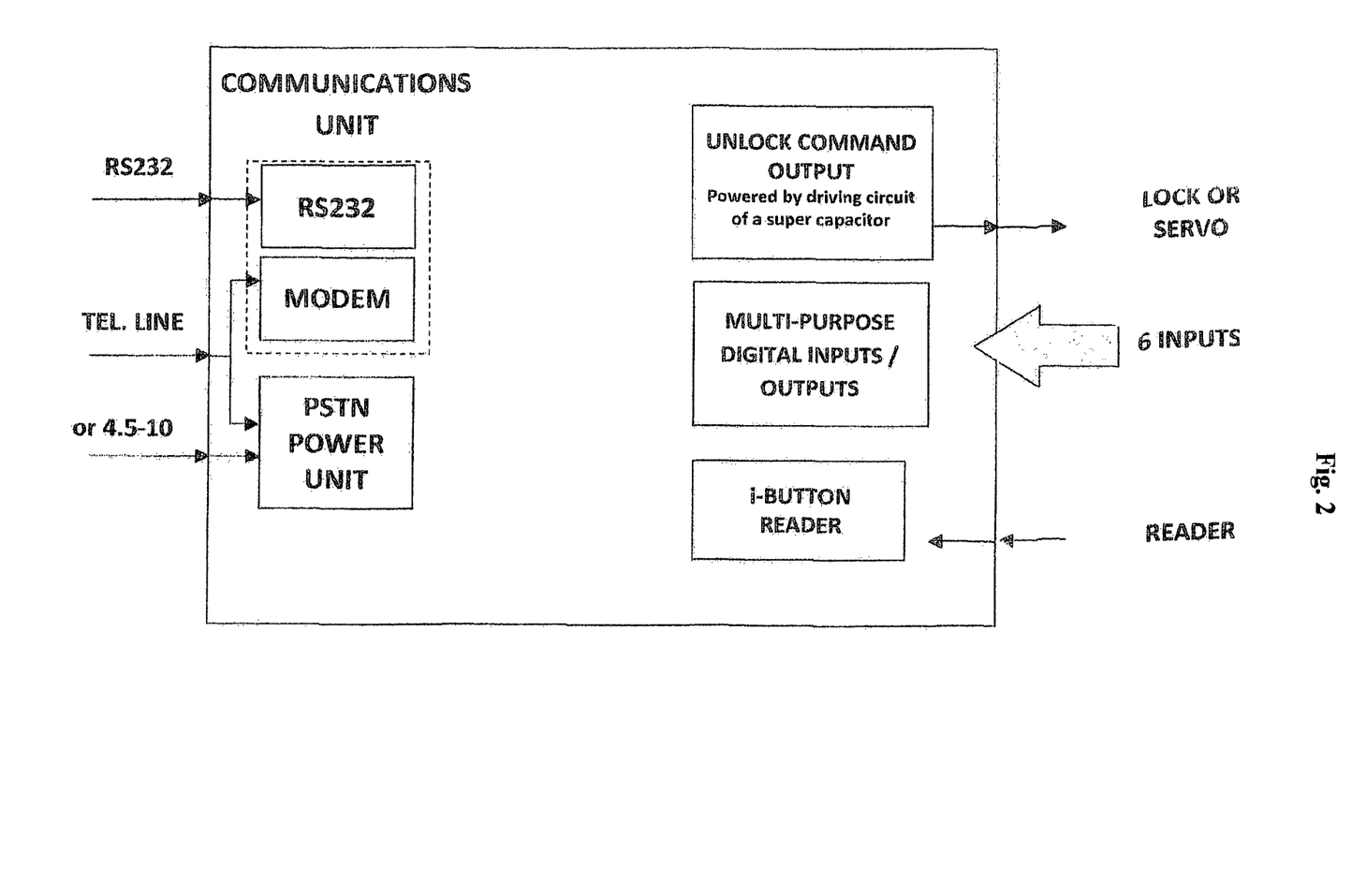

FIGS. 1 and 2 show a block diagram of the device and the connection with the environment. The basic functional elements are:
1) The power supply unit
2) The communication unit
3) The sensor unit and interface inputs/outputs (I/O interface)
4) The user interface unit ("Human" interface)
1) The central (core) controller unit 1. Power Unit The device is designed to operate with minimal energy. It provides two (2) alternative power sources:

A) Power supply from the telephone line even in the state of acoustic low ("On Hook"), where the total current consumed by the module is less than 2 mA.

B) Alternative power supply, in case that the device is not used with the operation of the modem, 4.5 to 10 VDC to 30 mA.

The device does not require a battery backup to operate.

2. Communications Unit

The device provides two (2) alternative communication interfaces:

A) Contacting the modem via the same telephone line that powers the modem.

B) Serial communication using RS232 or TTL level.

The two interfaces are independent and can be used simultaneously. The communication interfaces are highly customizable and can be used with the following combinations:

i. Upstream communication using only the telephone line.

ii. Upstream communication using only a serial interface (e.g. using external Ethernet to serial converter or using an external GPRS modem or using any other external communications device that has a serial input/output)

iii. Use of a modem and the serial interface for upstream connection, providing alternative communication paths and redundancy.

iv. Upstream communication using the telephone line and the serial interface as downstream communication with serial devices, providing a channel of communication via modem with remote devices.

The hardware components of the communication unit (modem) are specially selected and specific design methods have been implemented to minimize energy consumption. These items are supplied only during the communication process and can automatically recognize an incoming call and thus are activated.

The communication unit (modem) supports the following features:
  i. V.22bis-2400 bps
  ii. V.22/Bell212-1200 bps
  iii. V.21/Bell103-300 bps
  iv. V.23-1200/75 bps (with PAVI turnaround)

v. Bell202-1200 bps
vi. Be11202/V23 1200 bps
vii. FDX 4-wire operation
viii. V.22/Bell 212A/V.22bis synchronous modes
ix. International Call Progress support: FCC part 68, CTR21, JATE etc
x. DTMF generation and detection
xi. Worldwide Caller ID capability U.S. Type I and II support
xii. Compliance with EIA 777A
xiii. Compliance with SIA-2000
xiv. Supports SMS messages
xv. On chip hybrid driver
xvi. Blacklisting capability
xvii. Line-In-Use and Parallel Pick-Up (911) detection with voltage or low energy cost tracking method
xviii. Detect incoming call via CID route
xix. Ability of self-diagnostics.
3. Sensors and I/O unit
   3.1 The device provides 6 general purpose Inputs and Outputs which can be used alternatively with the following functions, depending on the settings
      i. Digital inputs with
         A) Two-level input (0 V and >2 V).
         B) Dry contact or Open Collector Input.
      ii. Monitored digital inputs using terminating resistance, so that the lines can be monitored for violation attempt (tampering). The unit includes an intelligent algorithm to recognize violation attempts of these inputs.
      iii. As a digital output with driving current/operation (pull down) up to 10 mA.
      iv. Analog input 0-1.25 Input Range.
      v. As PWM output for use as analog outputs.
      vi. exit command
   The device provides an open collector transistor output with up to 1 A driving. This output can also be driven from the telephone line, with energy stored in a super-capacitor. In case of Access Control function, this output is used to control an electromagnetic solenoid (electromagnet), or a servo-mechanism to lock and unlock the door (door control output).
      vii. Exit i-Button
   The device includes a special output with a serial interface cable (One Wire Serial interface) which can be used as:
      A) Reader input for the Access Control operation
      B) The interface for connection with a sensor cable.
   3.2 Sensors on the main board
      i. The device comprises a temperature sensor on the PCB
      ii. And monitors the voltage of the line in both the On Hook state and the Off Hook state.
4. Interface
   The device provides an input button and a buzzer. Depending on the sound of the buzzer, the unit indicates the status of the system or prompts the user to take action (e.g. a special sound indicates to the user that it needs to lock the door, or that entry has been successful, etc.). The interface button is a multi-purpose input (e.g. in case of monitoring remote cabins it can be used to indicate the presence of a technician at the point).
5. Controller
   The core of the device is the controller with its peripherals and the software (firmware), which supports the operation of the unit.
   The hardware components are selected for minimal energy consumption and are operating in 'sleep' state (energy saving mode) for most of the time. These items are enabled only during the sampling and as soon as the periodic monitoring is completed, they return to 'sleep' state (Sleep Mode).

Since the device is designed to operate in remote locations and is exposed to risks, a special design has been used to avoid situations in which the controller may 'hang' or 'freeze'. There is an internal and an independent external operations supervisor (watchdog) to monitor the proper functioning of the unit and restore the unit in case of abnormal operation.

The controller includes an additional program memory (flash type) of 1 Mbit for storing at least 1000 events and at least 1000 login credentials. This memory is static (non volatile) and ensures the integrity of the stored information when not powered.

A Real Time Clock—RT is also integrated in the controller to maintain the exact sequence of events.

Controller Software (FIRMWARE)

The operating system bases support some very powerful features which provide additional security and flexibility in the device:

All the energy is managed by the controller based on the operating system and the available energy resources.

All communications is encrypted (with 128 Bit encryption key).

All communication packets exchanged with the server (server) are controlled by cyclic redundancy check (CRC) for validity and their reception is confirmed on the part of the recipient.

To speed up the communication when there is a long delay (e.g. GPRS or GSM Modem), all packets can be transmitted in a continuous stream. Verification and confirmation of the receipt is performed asynchronously using a packet identifier.

The device can be upgraded remotely using special upgrade methods, which guarantee a successful upgrade, even in environments with the poorest communication conditions. Both communication interfaces can be used for the upgrading.

The Boot loader includes basic functionality, which allows the device to operate even when it is in boot loader mode.

The RTC is synchronized in all communications with the server.

Recording and reading of all the inputs and outputs (I/Os) is carried out at regular intervals. The sampling period is by default 1 Sec, but it can be adjusted. All inputs are monitored for violation attempts (tampering).

The management of all communications is made with interrupts, which can activate the system from the 'sleep' state.

The device can send to the server all events performed.

Any event, if configured in such a manner, may cause a recall procedure (callback) in order to connect with the server and report an event.

At least 1000 events can be stored in the controller, when it is not possible to communicate with the server. When the connection is established, all the events are sent to the server.

In addition to the events, the device can additionally send the entire system status. The status includes: the status of all inputs/outputs, measurements of all sensors, the status of all defined alarms and events and information of the key from the controller (e.g. alarms pending, etc.)

A. Functional Description

Based on the device settings, different functions and combinations can be used, indicatively stating:

1) As Door Monitoring Controller.

In this mode, the device is used to check the status of at least three doors. The purpose is to monitor both the lock status ("Locked" or "unlocked") and the door ("Open" and "Closed") so that we can conclude whether there was a valid entry or a violation of the door. More specifically:

Monitoring Port Status (Door Monitor):

It uses two sensors for each door, one for monitoring the status of the door and one for monitoring the status of the lock.

It includes a buzzer to indicate the state or to encourage the people on site to act.

It includes a User button, to indicate the presence of someone on site.

It sends events to the supervisory system to indicate a status change.

It saves the current state of the door based on previous actions.

Produced Events and Status of Door Controller

Valid Entry

If the lock is unlocked and in the next 20 seconds (NOTE: all times used are approximate and can be configured by the system) the door is opened, then it activates the event "Valid Entry" and its status becomes "Person on-Site=ON"). The buzzer prompts the technician to open the door within 20 seconds.

If the door is closed (closed) and in the next 20 seconds the lock is locked then it activates the event "Valid Exit", and its status becomes "Person On-Site=OFF". The buzzer prompts the technician to open the door within 20 seconds.

If the door is not opened within a period of 20 seconds of unlocking the lock, then it activates the event "Valid, No Entry Made", but the situation remains the same.

If the door is opened after 20 seconds, but in less than one hour from the time unlocked, then it activates the event "Delayed Valid Entry", its status becomes "Person On-Site=ON".

Door Violation

If the door is open and the lock is locked, then it activates the event "Door Forced" and its status is "Door Forced=ON".

If the door is open and one hour has passed from the door unlock, then it activates the event "Door Forced". The explanation in this case is that the door was left unlocked intentionally. The buzzer will produce a sound after 50 seconds, urging the person on-site to press the staff presence button, to prevent the generation of the Door Forced Alarm. Each press of the presence button restarts the timer.

Any status change in the lock, indicates that an authorized person is present and the "Door Cleared" event is activated, and it falls to the status "Door Forced=OFF".

Door Left Open

If the door is left open for more than one hour then the event "Door Left Open" is activated and the status becomes "Door Left Open=ON".

If the lock is locked, but the door is still open then it activates the event "Door Left Open" and the status becomes "Door Left Open=ON".

If the door is closed, or if any change to the lock position has been made, then the status becomes "Door Left Open=OFF".

Lock Forgotten Unlocked

If the lock is not locked within 20 seconds after closing the door, then it activates the event "Lock Left Unlocked" and the status becomes "Lock Left Unlocked=ON".

If the door remains unlocked for more than one hour, then it activates the event "Lock Left Unlocked" and the status becomes "Lock Left Unlocked=ON".

If the door is open or if any change to the lock position has been made, then it activates the event "Lock Left Unlocked Clear" and the status becomes "Door Left Open=OFF".

Sensor Violation

If any of the inputs has been violated, all the above messages are still valid, but an additional message is activated which indicates the violation of the sensor (tampered).

2) As an Access Controller

The device combined with an i-Button reader can operate as a fully functional access control system.

a.i) i-Button Reader

The identification of the access controller (access card) used by the device is the classic i-Button key. The reader can operate in two modes:

The device can authenticate the user according to the 64-bit ID (E.g. using DS1990A or RW1990)

The device can authenticate the user according to the 64-bit ID in combination with the additional 128 bits from the internal EEPROM (e.g. using DS1961S, i-Button with ID, 1 KEPROM and SHA1 encryption).

a.ii) Access Authorization

The authorization process is as follows:

The ID (and the additional bits) is read from the i-Button key.

Searching the ID to the local database (in the case of additional bits is then verified).

If the ID is found in the local data base:

If the ID is 'Active' and the time is within the time frame that is set in the access permission, then access is granted and the user can unlock the door. The dialing process is activated to inform the server for the valid entrance.

If the ID is 'Off' or the time frame is invalid, then the calling process is activated to inform the server about the ID, and authorization is not granted. While the server is connected, it can notify the device to provide access rights, if there is an authorization.

If the ID is not found in the local base

The dialing process is activated to inform the server about the ID and the authorization is not possible. While the server is connected 'On-Line', it can notify the device to provide access rights, if there is identification.

a.iii) Port Controller Output

If the authorization process is successful, a command is given to the of the access controller output to unlock the door.

Single Command Mode

This mode is used when the control mechanism is an electromagnet without 'Non Latching' function. For both the door locking and unlocking, access should be authorized by using the i-Button key. A programmable time frame (e.g. 5 seconds) is allowed to the user to lock or unlock the door. A special sound of the buzzer informs the user about the required action. In this mode, the device works in "Normally Secure" mode. E.g. when there is no power, the lock is secure and you can not lock or unlock it.

Dual Command Mode

This mode is used when a 'Non Latching' function, by electromagnet or a by a servo-mechanism is used. In this case the lock can be left unlocked and a separate authorization command must be issued to change its status. A special sound of the buzzer informs the user about the required action.

a.iv) Electromagnet or Servo-Mechanism Control

The appliance has been deigned to be capable of providing sufficient power to drive a low power electromagnet, which can control an existing mechanical lock. When access I granted the electromagnet and/or the servo-mechanism will allow the user to manually unlock. Thus the authorized user is the one who provides the energy to unlock the door in this way, and external power or batteries are not required. Power can be provided from a simple telephone line.

a.v) Access Control Information Update

The database of the access controller, associated with a particular access point is stored in the local memory of the device. This provides the functionality of direct access and the ability to provide access when the device is in offline mode.

The controller can store information for at least 1000 access keys along with their time frames.

The database may be updated by:
either one key at a time
or with a group of keys (package)
or the entire database may be deleted and updated entirely
A cyclic redundancy check (CRC) is generated after each change and can be verified by the server.

3) As a Remote Management Controller

Fully configurable software (firmware) can be used to monitor and control devices in a remote location and to provide the communication interface with the server. In this operational mode, all available interfaces (e.g. digital inputs and outputs, sensors and serial interfaces) can be used to connect and control external devices.

Use of any operating logic for the combination of inputs (digital and analog) with time frame for the activation of any controller or alarm output for transmission to the server.

Serial protocols (e.g. Modbus or proprietary protocols) can be used to read measurements and parameters from external devices and under certain conditions to issue and send commands to these same devices using the same protocol.

Transmission of commands remotely is possible to any eternal device connected to the device in examination.

Examples of control applications by using the device are:
Climate control with free cooling function (free cooling)
Generator Management
Artificial lighting Control etc.

4) As an Interface Modem

Figure 3:
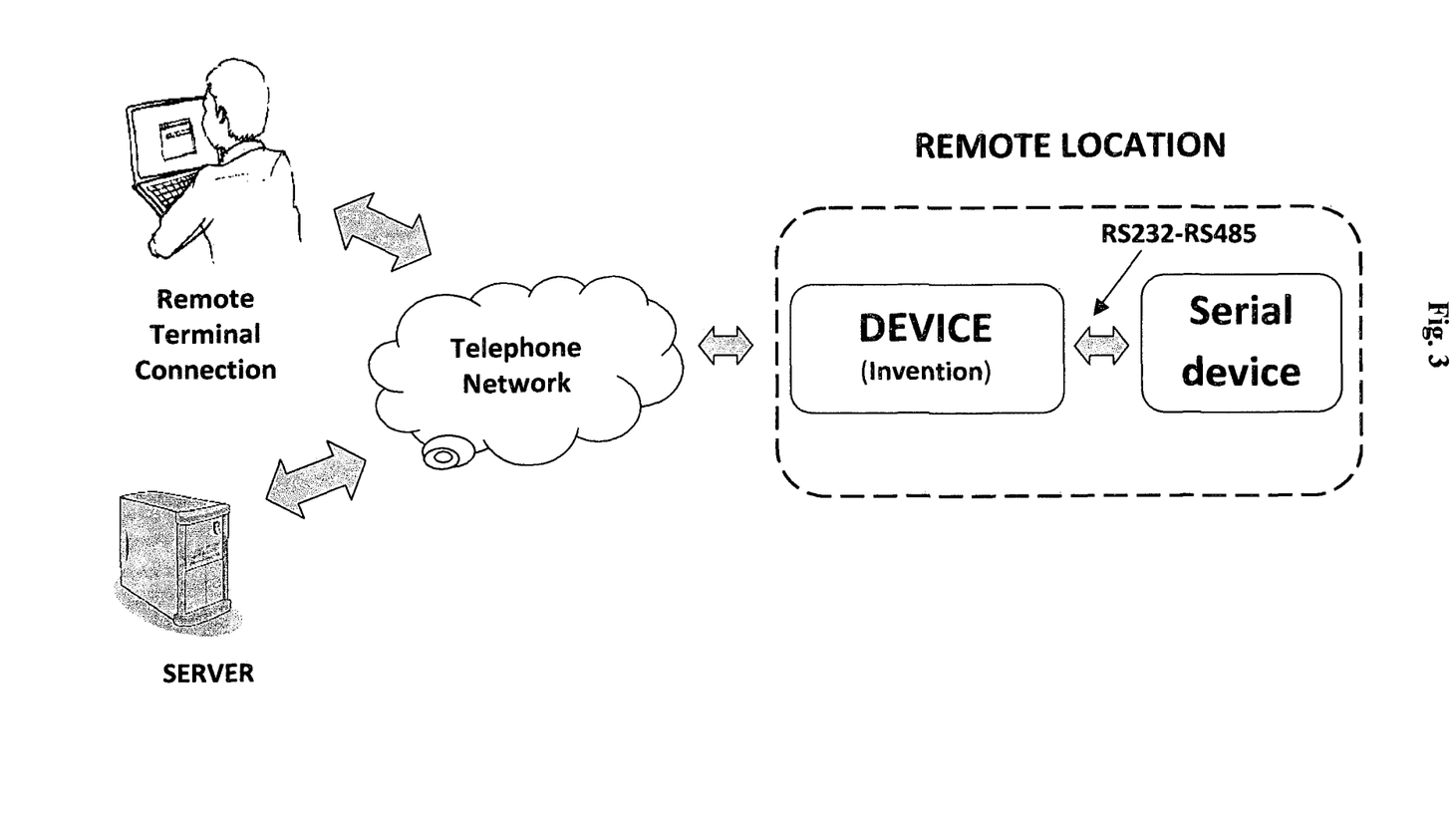

As shown in FIG. 3 the device can be used as communication interface between remote devices, which provide a serial interface, using a simple telephone line with a dial-up modem. There are several possible configurations in this case:

The apparatus may be configured to answer incoming calls of the server or of the application that communicates with a remote serial device. When the modem connection is in place, the communication is directly from the server/application to the serial device.

The device may carry out recurrent connections to the server (e.g. every one hour)

The device may perform connection when triggered by a serial device (a) through a digital input, (b) by means of an AT command.

Combination of the above cases.

The data exchanged may be raw data or enclosed in the device protocol, which can be encrypted, and be validated by cyclic redundancy check (CRC).

B. Deign Innovations

Figure 4:
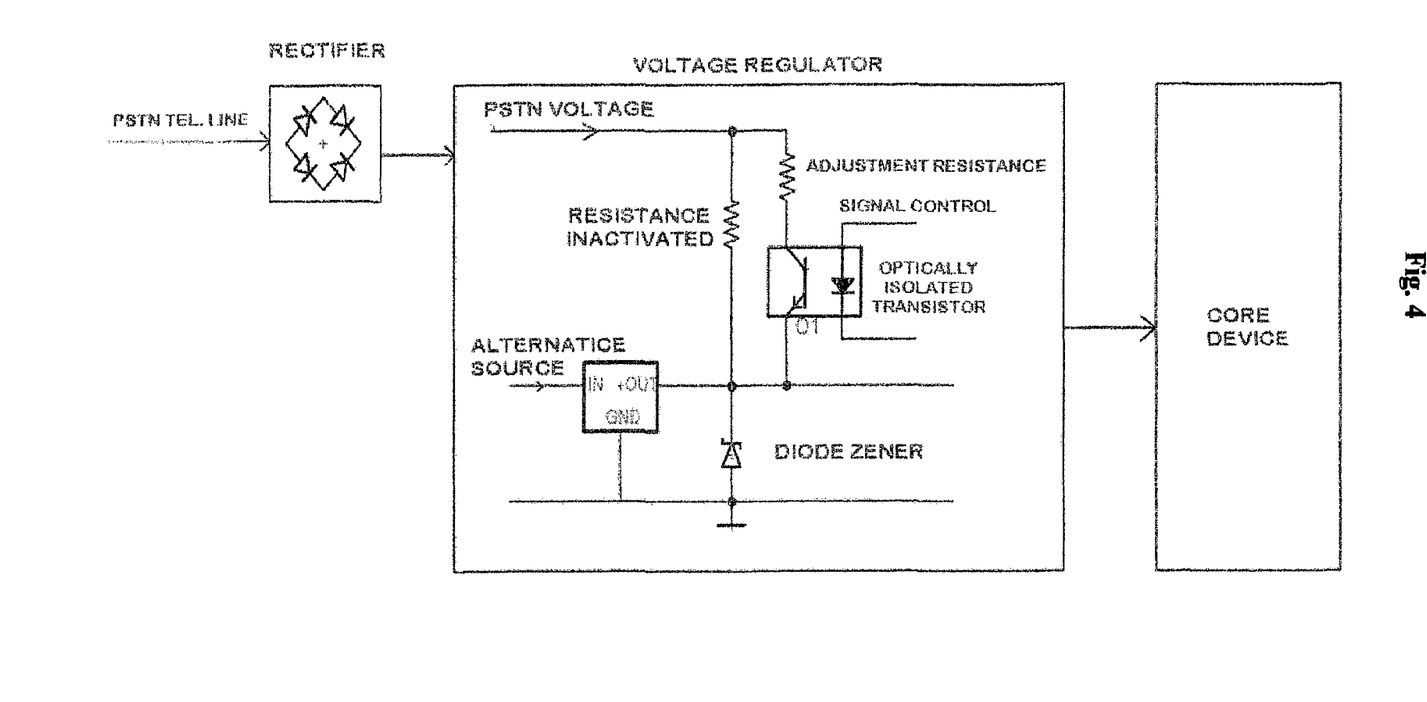

To meet the specific and unique characteristics of the device, an innovative deign architecture was used, both for it hardware and it software. Some of the innovative features of the design are:

In the power system of the device, when the device is powered by a telephone line, as shown in FIG. 4, the use of voltage regulators has been avoided a they would consume extra energy for the same function. In their place a specially selected Zener diode is used, and a resistance in series which varies according to the needs of the device in place. In this way:

In standby mode, the telephone line is in a state of "handset hook» (ON-HOOK), and the device is powered by a high value resistance. The current consumption in this case is less than 2 mA. Due to the small power, the diode keeps the voltage lower than the nominal value and the total power consumed in the electronics of the device is 4 mW.

Due to the very low power required, all the call centers 'see' the line status as "handset hook." If the current exceeded the 3 mA, many call centers would consider the line as faulty and that calls to the device are not possible.

In full operational mode and/or communication mode, via an optically isolated transistor, in parallel with the high value resistance, the adjustment resistance of the line is tucked (~500 Ohm) and the telephone line enters the state of "handset lifted". In this way, the electronic part of the device can absorb up to 20 mA. Simultaneously the setting voltage is rising at values which allow the operation of the modem as well.

If the device is used in applications without phone line, an alternative voltage regulator is provided, operating from 4.5 V to 10 V.

Also when the communication through the modem is not used, it is possible to power the device directly with up to 60 V. The polarity of the power connection, either through the telephone line or through an external supply source to 60 V is indifferent.

The input of the telephone line, which is exposed to surge, is protected with a Transient Voltage Suppressor (TVS) of high power:
Peak pulse power: 1500 W
Continuous power output: 6.5 W
Peak Forward Surge Current: 200 A
The device units that consume power were selected to have the least possible power requirements and their supply is controlled by the microcontroller, so that they enter into operation only when it is necessary. More specifically:
The modem is fed only during communications. For this reason the monitoring of incoming calls from the controller using interrupts.
The voltage at supervised inputs is present only during measurement, which takes less than 10 mSec.

The controller is deactivated when not performing a function. It is triggered every second to perform its cycle, which takes less than 10 mSec.

The controller uses a low operating frequency 1 MHz, to reduce its consumption. When there is energy available in "handset lifted" state and there is need for rapid processing (e.g. searching through the database to allow access rights) or need for fast communication (e.g. i-Button communication) the frequency rises to 8 MHz.

The inputs of the device are designed so as to have multiple uses with minimal additional electronics to save energy. The functions provided are:

Simple digital input,

Supervised input, with voltage and current verification

Analog input

Energy Storage System in a super-capacitor, to be capable for short periods of time (~1 minute) to provide power far greater than that offered by the PSTN telephone line. In this way it can drive the electromagnet lock control. The charging control algorithm optimizes the absorption of energy, by controlling the status of the telephone line (handset mode).

Figure 5:
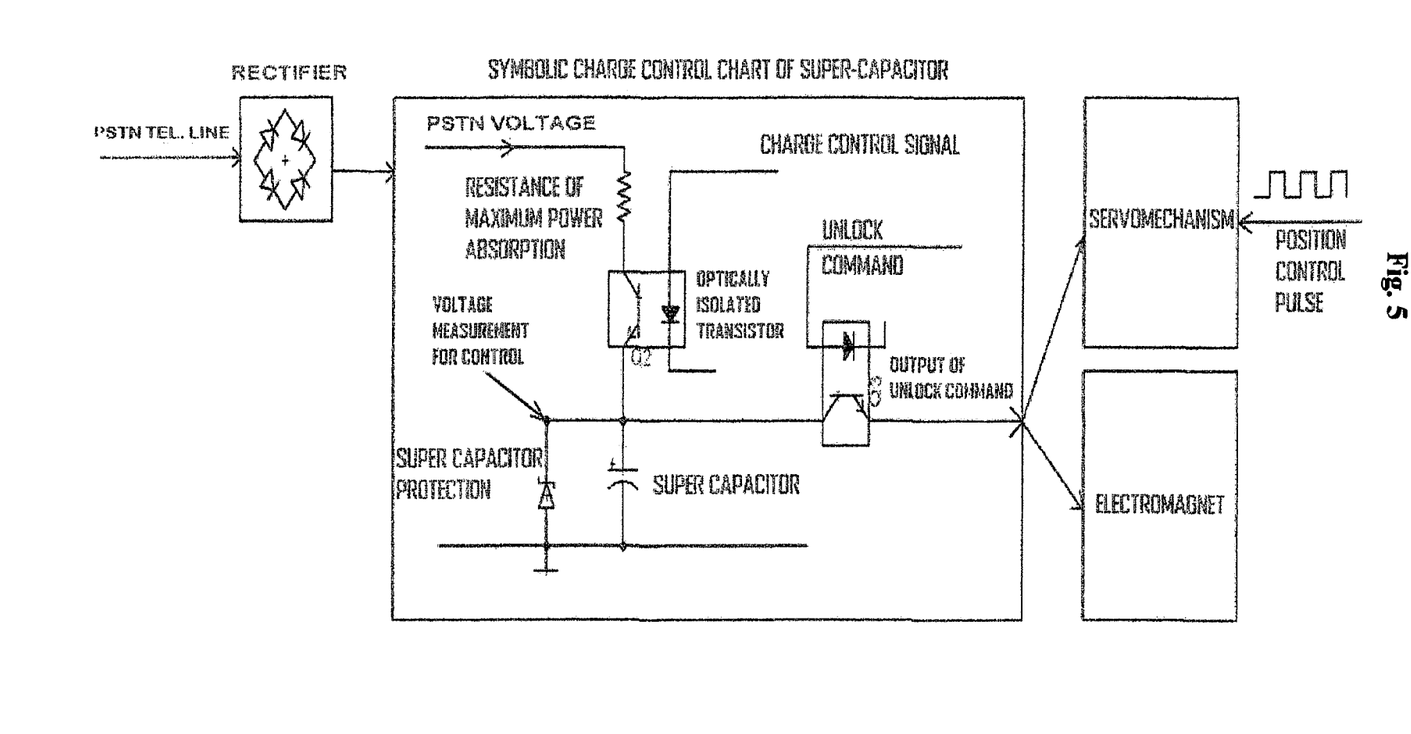

FIG. 5 shows the block diagram of the charging control circuit of the super-capacitor. The optically isolated transistor controls the time of the capacitor charging. This time is controlled and charging of the capacitor stops before the telephone center (PBX) terminates the call status. The process is repeated until the capacitor is charged to full voltage. Charging is carried out at 'dead times', when the device is not communicating. All charging parameters are adjustable by the software, to enable the device adaptation to different telephone networks.

In case that a servo-mechanism is used for 'unlocking', one of the input-output points of the device is set as output and provide the pulse series control position, while the energy is obtained by the super-capacitor.

The invention claimed is:

1. An electronic device for surveillance and monitoring of an area, which comprises the following:
   (i) means for data collection from the specific area,
   (ii) means for processing the collected data,
   (iii) means for transmitting the processed data and for the exchange of information with one or more remote servers,
   (iv) means for access control in this area,
   (v.) means programmed to manage various local electrical and/or electronic devices and to perform remote intervention to connected devices,
   (vi.) a voltage regulator that is connected to the public switched telephone network (PSTN), the voltage regulator comprising a Zener diode in series with a resistance to maintain a power consumption of the electronic device of less than 4 mW thereby allowing the PSTN to be used for communication while the electronic device is operating.

2. An electronic device in accordance claim 1, characterized in that it provides an alternative serial communication option with the server.

3. An electronic device in accordance claim 1, characterized in that it is capable to control the access in an area, using I-button technology for user authentication.

4. An electronic device in accordance with claim 1, characterized in that it keeps in records at minimum 1,000 authorized users and allows access to them, even when there is a communication interruption with the server.

5. An electronic device in accordance claim 1, characterized in that it can be used as a communications interface, among remote devices which feature a serial port control.

6. An electronic device for surveillance and monitoring of an area, comprising:
   sensor units to collect data from the area;
   a processing module to process the collected data;
   a data transmission module to transmit the processed data and for exchange of information with one or more remote servers;
   an access control module to control access to the area;
   a programming module to manage various local electrical and/or electronic devices and to perform remote intervention to connected devices; and
   a voltage regulator that is connected to the public switched telephone network (PSTN), the voltage regulator comprising a Zener diode in series with a resistance to maintain a power consumption of the electronic device of less than 4 mW thereby allowing the PSTN to be used for communication while the electronic device is operating.

7. The electronic device of claim 6, wherein in a standby mode the Zener diode maintains a voltage lower than a nominal value and with a current consumption by the electronic device of less than 2 mA.

8. The electronic device of claim 7, wherein a very low power requirement of the electronic device maintains the status of the PSTN as handset on-hook.

9. The electronic device of claim 6, wherein the resistance in series with the Zener diode comprises a variable resistance.

* * * * *